UNITED STATES PATENT OFFICE.

WILLIAM HILTON, OF BELVIDERE, NEW JERSEY.

IMPROVED LUBRICATING COMPOSITION.

Specification forming part of Letters Patent No. 41,068, dated January 5, 1864.

*To all whom it may concern:*

Be it known that I, WILLIAM HILTON, of Belvidere, Warren county, New Jersey, have invented a new and improved lubricating-oil for oiling machinery, and possessing the following advantages: first, it does not gum or clog machinery, even after long standing; second, it does not congeal nor stiffen under very low temperatures—say 13° below zero; third, it does not affect metal forming the acetates, so frequently observed in other oils; fourth, it possesses great body, thus satisfactorily preventing friction; fifth, the non-conducting properties of the rosin and sulphur used prevent heating in journals—being a great advantage over all lubricating-oils now in use.

To enable others skilled in the art to make and use my oil, I will proceed to name the articles of which it is composed and the quantum of each article to make a given quantity.

For every thirty-nine gallons take thirteen gallons of petroleum-oil, pulverize twelve ounces white rosin with one pound flowers of sulphur, mix them with the petroleum and shake together till dissolved, which will require about forty-eight hours; then add the whole to twenty-six gallons of lard-oil or rancid butter. Now add eight ounces of common salt finely pulverized, stir the whole together for twelve hours and let it rest for four or five days, and it is fit for use.

What I claim as my invention, and desire to secure by Letters Patent, is—

The admixture of the foregoing ingredients in the proportions named, and thereby manufacturing a new lubricating-oil for oiling machinery.

WM. HILTON.

Witnesses:
P. B. KENNEDY,
SIMEON COOKE.